May 28, 1968 R. S. FARR 3,385,034
TWO-STAGE FILTER HOUSING AND SEAL ARRANGEMENT
Filed Feb. 17, 1966
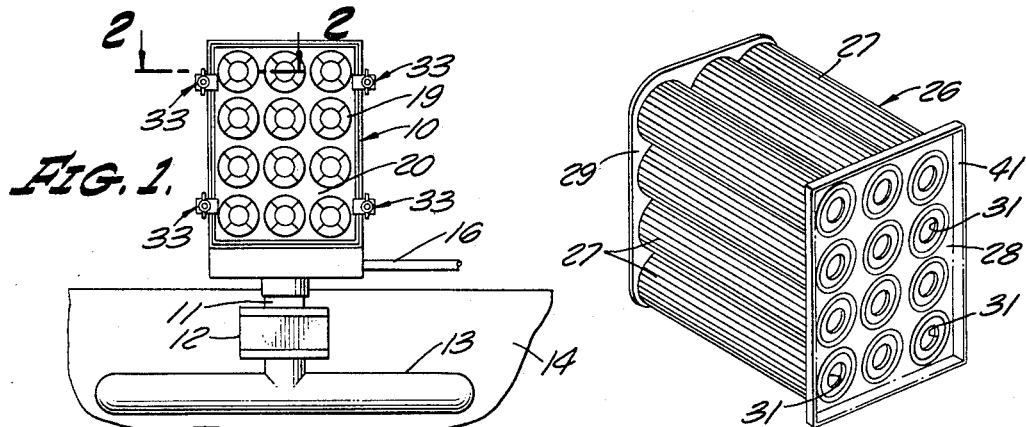
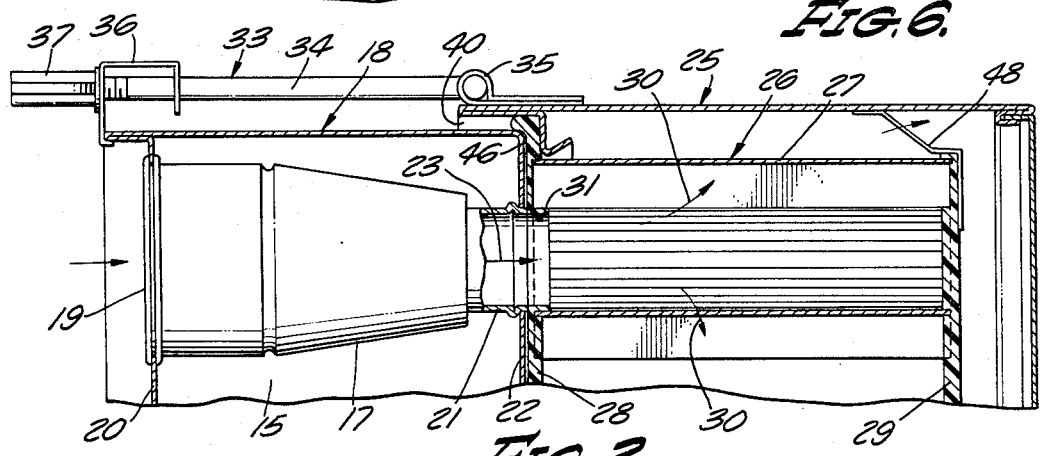
RICHARD S. FARR
INVENTOR.
BY Lyon & Lyon
ATTORNEYS

United States Patent Office 3,385,034
Patented May 28, 1968

3,385,034
TWO-STAGE FILTER HOUSING AND
SEAL ARRANGEMENT
Richard S. Farr, Los Angeles, Calif., assignor to
Farr Company, El Segundo, Calif., a corporation
of California
Filed Feb. 17, 1966, Ser. No. 528,233
4 Claims. (Cl. 55—337)

ABSTRACT OF THE DISCLOSURE

A filter apparatus having two filtering stages each contained in a separate housing with the housings assembled together for operation where one filtering stage employs a disposable cartridge and has a flange of resilient material clamped between the two housings to form the seal therebetween by an inclined ridge on one housing embedding itself in the flange and a peripheral bead on the flange filling a peripheral gap between the two housings.

---

This invention relates to air filters and particularly to two-stage filters of the type shown in United States Letters Patent No. 3,071,915 wherein two separable housings contain the two filtering stages and must be joined in sealed relationship for operation. In many forms of two stage filters an inertial separator type first stage must be sealably joined to a replaceable pass-through media type filter. Moreover the media type filter may be comprised of plural individual filter elements that must be sealably joined together in parallel flow relationship. These requirements are particularly, although not exclusively, found in the two stage filter disclosed in the afore-mentioned patent. In that filter a plurality of tubular filter elements comprised of longitudinally pleated filter paper formed into a cylinder are assembled together to form a filter cartridge by forming an appropriate molded flange on each end of the plural tubular filter elements. By molding the flange that is adjacent the first filter stage of a plastic or rubber-like material, that flange may also serve as the sealing means between the housings of the two stages as disclosed in that patent.

However it has been found that these dual requirements of the sealing flange serving as both a structural support for joining the filter elements as a cartridge and serving as a seal between the housings are somewhat divergent and incompatible. An ideal sealing material would be relatively soft to accomplish an air-tight seal around the entire periphery with a minimum of clamping force required between the housings and yet a relatively stiff material would be more satisfactory as a structural support flange. Many plastic materials serve as a relatively satisfactory compromise among the desired properties under normal or ideal conditions but under slightly abnormal or extreme conditions certain difficulties have been encountered. The most prominent difficulty has been in accomplishing a satisfactory seal between the housings under the variety of conditions of temperature, use, time duration and housing shape. For example, some of the more ideally suited plastic materials for the flange have the characteristic faults of becoming stiff at reduced temperatures and shrinking slightly with age. Further, in each installation the housings are reused indefinitely while the filter cartridge is periodically replaced and therefore the condition and shape of the sealing surfaces of the housings may become damaged to a degree that would not seemingly require replacement but actually would adversely affect the seal.

Accordingly by this invention there is provided a novel form of two stage filter assembly having separable housings with a unique form of sealing and support flange interposed therebetween and cooperating with uniquely sized and shaped portions of the housings to form a reliable seal between the housings.

An object of this invention is to provide a novel form of two stage filter wherein the housing of one stage fits partially within the housing of the other stage with a peripheral gap therebetween and with a filter cartridge flange of rubber-like material positioned to form a seal between the housings. Another object is to provide the sealing flange with a peripheral bead of the rubber-like material to extend into the peripheral gap formed between the two housings to enhance the seal and resist shrinkage of the flange. Another object of this invention is to provide such a filter wherein one of the housings is provided with an inclined surface engaging the sealing flange in a manner to impose an increased unit pressure along a limited portion of the sealing flange to enhance the seal formed therebetween. Still another object of this invention is to provide the sealing flange with a thickened cross section of a shape which is urged toward filling the space between the two housings upon clamping assembly of the two housings together.

Other and more detailed objects and advantages of this invention will appear from the following description and the accompanying drawings, wherein:

FIGURE 1 is an elevation view of the two-stage filter assembly of this invention installed on the intake of an internal combustion engine.

FIGURE 2 is a fragmentary sectional view taken substantially on the line 2—2 in FIGURE 1 and illustrating the interior of the filter.

FIGURE 3 is an enlarged fragmentary view of the relationship among the two housings and the interposed sealing flange before the two housings are clamped together.

FIGURE 4 is a fragmentary sectional view similar to FIGURE 3 but illustrating the relationship after clamping the two housings together.

FIGURE 5 is a fragmentary view similar to FIGURE 3 and illustrating a modified configuration of the sealing flange.

FIGURE 6 is a perspective view of the second stage filter cartridge employed in the device illustrated in FIGURE 1.

The two stage air filter assembly incorporating this invention is generally designated 10 and is basically the same type filter as that which is disclosed in the afore-mentioned U.S. Letters Patent 3,071,915. In a typical installation the filter assembly 10 is mounted on or connected to the air intake 11 of a carburetor 12 which is in turn connected to the intake manifold 13 of an internal combustion engine 14 of a tractor or the like. The air passing through filter assembly 10 is filtered in two separate stages before reaching air intake 11. The first of the two fltering stages is an inertial separator type filter 15 which includes a bleed off conduit 16 connected to an aspirator (not shown) or the like for continually removing the dust separated by filter 15 together with a bleed portion of the intake air.

The first stage filter 15 includes a plurality of cyclonic filter units 17 mounted in a sheet metal housing generally designated 18. There are a variety of styles of cyclonic filter units 17 well known to those skilled in the art and therefore a detailed description of such unit is believed unnecessary. Each cyclonic unit 17 has its inlet end 19 mounted in the front wall 20 of the housing 18 and has its fresh air outlet tube 21 mounted in the rear wall 22 of housing 18. The separated dust and bleed air passes into the interior of housing 18 from which it is drawn off through conduit 16. The air cleaned in this first stage passes out through the tubes 21 of the plural cyclonic units in the direction of arrow 23 into the second filtering stage.

The second stage of filter assembly 10 is provided within a second sheet metal housing generally designated 25. A replaceable filter cartridge, generally designated 26, is releasably mounted in the housing 25 and filters the air received from the first stage. The filter cartridge 26 is comprised of a plurality of tubular pleated paper filter elements 27 joined by a pair of front and rear end walls or flanges 28 and 29 to form an integral unit. The tubular filter elements 27 are arranged in parallel flow relationship and each tubular filter element 27 is positioned to mate with a cyclonic filter unit 17 in axial alignment. Each of the filter elements 27 is comprised of a filter paper pleated and rolled into a cylinder with appropriate means for retaining the tubular configuration. The end flanges 28 and 29 serve both to structurally support the filter elements 27 and to insure that all of the air entering the interior of the element must pass outwardly through the filter paper rather than leaking past the ends. To this end the flanges are molded with the elements 27 in place from a liquid which cures or "hardens" to a relatively soft and flexible plastic or rubber-like material with the ends of the pleated filter paper embedded in the material to an adequate depth to insure a complete seal. End flange 28 is provided with openings 31 for aligning with the tubes 21 to receive the air whereas flange walls 29 completely closes the end of each filter element 27. In this manner the filtered air from cyclonic unit 17 passes in the direction of arrow 23 into the interior of the tubular filter element 27 and then outwardly through the filter paper in the direction of arrows 30 into the surrounding interior of housing 25. This pass-through filtering stage removes any dust or particulate matter that passed through the cyclonic filter stage and yet the cyclonic filter stage protects and increases the longevity of filter elements 27 by removing a majority of the dust and particulate matter from the incoming air. As thus far described the filter assembly 10 is substantially identical to the filter disclosed in the afore-mentioned U.S. Letters Patent 3,071,915.

The housings 18 and 25 may be of any convenient size for the particular installation and for containing the various components. One housing is adapted to fit within the other housing, here housing 18 fits within housing 25, and a plurality of clamps 33 are used to releasably clamp the two housings together. Clamps 33 may be of any convenient form such as that shown wherein a stud bolt 34 is pivotally connected by a right angle portion 35 to the housing 25 and fits into a grooved bracket 36 on housing 18 with a wing nut 37 threadedly engaging the bolt 34. By manipulating the wing nuts 37 the housings may be joined or separated as desired. Housing 18 fits within housing 25 for a short distance and is slightly though noticeably smaller than housing 25 whereby a peripheral gap 40 is formed between the two housings. Gap 40 is typically about one quarter of an inch around the entire periphery of the housings although it is to be understood that this gap size can be substantially varied without departing from this invention. By providing this substantial difference in the sizes of the two housings, it is obvious that the arrangement can accommodate minor variations in housing sizes resulting from both manufacturing tolerances and subsequent use in the field.

The seal between the two housings is accomplished by the peripheral seal portion 41 of the filter cartridge flange 28. Referring particularly to FIGURE 3, the seal portion 41 is substantially the same around the entire periphery of the flange 28 and includes an axially or laterally extending bead 42 projecting into the peripheral gap 40. Bead 42 is of a width substantially equal to the width of gap 40. The peripheral seal portion 41 preferably is thickened by an outwardly inclined portion 43 extending from the plane of the flange 28 to the bead 42. A peripheral ridge 44 is formed on the interior of housing 25 as a backup to the flange 28. A return edge or lip 45 of sheet metal serves to strengthen the ridge 44 and eliminate any exposed sharp edges. Ridge 44 is preferably inclined to the back side of flange 28 at an angle A of approximately five degrees. By this arrangement when the filter cartridge 26 is inserted in housing 25 and housing 18 is installed by manipulating the clamps 33, the corner 46 of front wall 22 of housing 18 will be urged against the front of the flange 28 and this force will be supported by the ridge 44. Ridge 44 extends inwardly from the wall of the housing 25 a distance substantially greater than the size of gap 40, shown here as approximately twice as far as the gap. The corner portion 46 will first engage the inclined surface 43 of the thickened seal portion 41 and continued tightening of the clamps 33 will cause the peripheral seal portion to be urged toward the corner formed at the base of ridge 44 whereby a seal is formed both on the interior wall 47 of housing 25 and the surface of ridge 44. Moreover the inclined attitude of ridge 44 produces an increased force per unit area between the flange and the outer extremity of ridge 44 whereby the ridge 44 tends to become embedded in the rubber-like material of the flange 28 to enhance the seal. Since the bead 42 is captured in the peripheral gap 40 between the two housings in this clamped condition, the inherent characteristic of many of the more acceptable flange materials to tend to shrink will be resisted. Moreover this sealing arrangement also forms a completely adequate structural support in the housings for flange 28 of the filter cartridge 26. Flange 29 at the rear of cartridge 26 is supported in a plurality of metal brackets 48.

Referring now to FIGURE 5, a simplified modification of the heretofore described peripheral seal portion 41 of the front flange 28 is illustrated and designated as seal portion 41a of flange 28a. In this modification the housings 18a and 25a are the same as heretofore described including the inclined ridge 44a. The peripheral seal portion 41a is provided with an axially extending bead 42a of a width equal to the gap 40a between the housings. However in this embodiment the inclined portion 43 is omitted whereby the only thickened portion of the flange 28a is the bead 42a. Again clamping of the two housings 18a and 25a together causes the extremity of ridge 44a to become embedded in the peripheral seal portion 41a by reason of the localized or increased unit pressure and the captured condition of bead 42a inhibits shrinkage of the flange 28a.

Thus it may be seen by this invention that a unique cooperative relationship is provided among the two housings of a two stage filter and the seal therebetween as formed by a portion of the second stage filter cartridge. The dimensions of the housings are less critical and mishandling in field service will be less likely to result in prohibiting the reassembly of the housings. A dependable seal is formed with a minimum of actual force applied by the plural clamps 33 thereby permitting the use of less rigid and heavy housings 18 and 25 than would otherwise be advisable. Having fully described my invention it is to be understood that I do not wish to be limited to the details herein set forth but my invention is of the full scope of the appended claims.

I claim:

1. In a two-stage filter having a separate rigid housing for each stage with a filter cartridge positioned in one housing and the cartridge having an integral resilient flange clamped between the two housings to form a seal between the housings and to seal the cartridge to said one housing, the improvement comprising the combination of; said one housing having a peripheral projecting end wall, a peripheral seal portion on said flange for closely fitting within said projecting end wall of said one housing, that one housing having an inwardly projecting ridge spaced inwardly on said projecting end wall for engaging and supporting one side of the seal portion of the flange, said ridge inclined at a small angle toward said one side of the flange for the ridge to embed in and form a seal with said flange, the other housing having an end portion slightly smaller than the projecting end wall of said one housing for fitting within the said one housing and forming a peripheral gap between said projecting end wall and said end portion, and said seal portion having a peripheral bead extending into and substantially across said gap for forming a seal in the peripheral gap between said housings and for supporting said filter cartridge.

2. The combination of claim 1 wherein the said angle of inclination of said ridge is substantially five degrees and said ridge has a projecting extremity curved away from said flange to become embedded therein without cutting said flange.

3. The combination of claim 1 wherein said peripheral seal portion is of a thickened cross-section increasing in the outward direction for filling the depressed portion formed by said inclined ridge upon clamping the housings together.

4. In a two-stage filter having a separate rigid housing for each stage with the two housings joined in an assembled operating condition of the filter, the combination of; a filter cartridge for removably positioning in one of said housings for comprising one filtering stage, said filter cartridge including a plurality of separate tubular filter elements of pleated filter media, a molded flange of resilient material comprising one end of said filter cartridge and bonded to and supporting said plurality of filter elements, a first of said two housings having a projecting end wall, said flange having a peripheral seal portion for closely fitting within said projecting end wall of said first housing, said first housing having an inwardly projecting ridge spaced inwardly on said projecting end wall for engaging and supporting one side of the seal portion of the flange, said ridge inclined at a small angle toward said one side of the flange, the other housing having an end portion slightly smaller than the said projecting end wall of said first housing by less than the inward projection of said ridge for fitting within said projecting end wall up to said ridge in the first housing and forming a peripheral gap between said end portion and said projecting end wall, said seal portion positioned between said ridge and end portion and having a peripheral bead extending into said gap, and clamp means urging said housings together to squeeze said seal portion between said housings for embedding said inclined ridge in said seal portion and urging said peripheral bead into said peripheral gap for forming a seal between said projecting end wall and said end portion.

References Cited
UNITED STATES PATENTS

| | | | |
|---|---|---|---|
| 2,441,365 | 5/1948 | McAllister | 55—467 |
| 2,770,320 | 11/1956 | Dreznes | 55—503 |
| 2,792,906 | 5/1957 | Evans | 55—502 |
| 2,871,976 | 2/1959 | Sebok | 55—502 |
| 3,071,915 | 1/1963 | Hardy | 55—324 |
| 3,186,552 | 6/1965 | Cutler | 55—510 |
| 3,257,784 | 6/1966 | Grellsson | 55—472 |
| 3,283,908 | 11/1966 | Komarmy et al. | 210—493 |

FOREIGN PATENTS 426,655  4/1935  Great Britain.

HARRY B. THORNTON, *Primary Examiner.*

B. NOZICK, *Assistant Examiner.*